United States Patent
Zavala et al.

(10) Patent No.: US 12,264,728 B1
(45) Date of Patent: Apr. 1, 2025

(54) GEAR LOAD CANCELING ELECTRIC DRIVE UNIT ARCHITECTURE

(71) Applicant: GM Global Technology Operations LLC, Detroit, MI (US)

(72) Inventors: Favian Zavala, Northville, MI (US); Peter Tomsa, Clarkston, MI (US); Chi Teck Lee, Novi, MI (US); Christopher Michael Kaminski, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/886,263

(22) Filed: Sep. 16, 2024

(51) Int. Cl.
| | | |
|---|---|---|
| *F16H 37/08* | (2006.01) | |
| *B60K 1/00* | (2006.01) | |
| *B60K 17/04* | (2006.01) | |
| *B60K 17/16* | (2006.01) | |
| *F16H 57/02* | (2012.01) | |
| *F16H 57/021* | (2012.01) | |

(52) U.S. Cl.
CPC .......... *F16H 37/0813* (2013.01); *B60K 1/00* (2013.01); *B60K 17/043* (2013.01); *B60K 17/165* (2013.01); *F16H 57/021* (2013.01); *B60K 2001/001* (2013.01); *F16H 2057/02034* (2013.01); *F16H 2057/02052* (2013.01)

(58) Field of Classification Search
CPC ....... F16H 37/0813; F16H 2057/02034; B60K 2001/001
See application file for complete search history.

(56) References Cited

U.S. PATENT DOCUMENTS

| | | | |
|---|---|---|---|
| 4,732,053 A * | 3/1988 | Gleasman | ........... F16H 37/0813 475/221 |
| 6,793,600 B2 * | 9/2004 | Hiraiwa | ................. B60K 6/445 903/910 |
| 10,557,536 B2 | 2/2020 | Littlefield et al. | |
| 2013/0123058 A1 * | 5/2013 | Markl | .................. B60K 17/165 475/150 |
| 2017/0023115 A1 * | 1/2017 | Valesh | .................... F16H 3/006 |
| 2020/0127533 A1 | 4/2020 | Hung et al. | |

\* cited by examiner

*Primary Examiner* — Huan Le
(74) *Attorney, Agent, or Firm* — Vivacqua Crane, PLLC

(57) ABSTRACT

An electric vehicle drive unit includes an electric motor generating a torque. An input differential splits the torque into a first torque created by a first side gear and a second torque created by a second side gear. A first pinion gear shaft assembly receives the first torque and has a first pinion gear. A second pinion gear shaft assembly receives the second torque and has a second pinion gear. A first stage transfer gear assembly has a first, a second, a third, and a fourth transfer gear. A first stage speed reduction meshes the first pinion gear with the first transfer gear and the third transfer gear, and meshes the second pinion gear, the second transfer gear and the fourth transfer gear. A second stage gear assembly engages the first stage transfer gear assembly and includes a first final drive gear and a second final drive gear.

18 Claims, 3 Drawing Sheets

GEAR LOAD CANCELING ELECTRIC DRIVE UNIT ARCHITECTURE

INTRODUCTION

The present disclosure relates to electric drive units for electric vehicles.

For electric vehicle use, a drive unit defines a system that takes an electric motor torque from a singular electric machine and splits the electric motor torque into differing output paths via an input differential. Electric drive units commonly provide output from opposed sides of a differential and thereby lose efficiency and require unnecessary housing size and weight.

Thus, while current systems and methods to provide electric drive units of electric vehicles achieve their intended purpose, there is a need for a new and improved system and method to operate an electric vehicle drive unit.

SUMMARY

According to several aspects, an electric vehicle drive unit includes an electric motor generating a torque. An input differential splits the torque into a first torque created by a first side gear and a second torque created by a second side gear. A first pinion gear shaft assembly receives the first torque and has a first pinion gear, and a second pinion gear shaft assembly receives the second torque and has a second pinion gear. A first stage transfer gear assembly has a first transfer gear, a second transfer gear, a third transfer gear, and a fourth transfer gear. A first stage speed reduction is achieved by meshing the first pinion gear with the first transfer gear and the third transfer gear, and by meshing the second pinion gear with the second transfer gear and the fourth transfer gear. A second stage gear assembly is engaged with the first stage transfer gear assembly, the second stage gear assembly having a first final drive gear and a second final drive gear.

In another aspect of the present disclosure, the first pinion gear shaft assembly and the second pinion gear shaft assembly are positioned on a same side of the input differential.

In another aspect of the present disclosure, the first pinion gear shaft assembly and the second pinion gear shaft assembly are configured in a concentrically and radially stacked arrangement.

In another aspect of the present disclosure, the concentrically stacked arrangement and the radially stacked arrangement of the first and second pinion gear shaft assemblies includes the first pinion gear shaft assembly being rotatably and slidably disposed within the second pinion gear shaft assembly.

In another aspect of the present disclosure, the first pinion gear and the second pinion gear have opposed helix hands canceling axial loads of the first pinion gear and the second pinion gear.

In another aspect of the present disclosure, the first transfer gear of the first stage transfer gear assembly is connected to a third pinion gear, the second transfer gear is connected to a fourth pinion gear, the third transfer gear is connected to a fifth pinion gear, and the fourth transfer gear is connected to a sixth pinion gear.

In another aspect of the present disclosure, a first speed reduction achieved by meshing the first pinion gear with the first transfer gear and the third transfer gear, and by meshing the second pinion gear with the second transfer gear and the fourth transfer gear.

In another aspect of the present disclosure, a second speed reduction achieved by meshing the third pinion gear and the fifth pinion gear with the first final drive gear and by meshing the fourth pinion gear and the sixth pinion gear with the second final drive gear.

In another aspect of the present disclosure, a center point of individual axes of: the first transfer gear and the third pinion gear; of the second transfer gear and the fourth pinion gear; of the third transfer gear and the fifth pinion gear; and of the fourth transfer gear and the sixth pinion gear are colinear, thereby canceling radial loads.

In another aspect of the present disclosure, a housing surrounds the first pinion gear shaft assembly, the second pinion gear shaft assembly, the first stage transfer gear assembly and the second stage gear assembly. A shaft supports the fourth pinion gear together with the second transfer gear. An extending portion of the shaft is rotatably supported by a bearing wherein the bearing is not supported by and connected to the housing.

According to several aspects, an electric vehicle drive unit includes an electric motor generating a torque. An input differential splits the torque into a first torque created by a first side gear and a second torque created by a second side gear. A first pinion gear shaft assembly receives the first torque and has a first pinion gear, and a second pinion gear shaft assembly receives the second torque and has a second pinion gear. A first stage transfer gear assembly has a first transfer gear connected to a third pinion gear, a second transfer gear connected to a fourth pinion gear, a third transfer gear connected to a fifth pinion gear, and a fourth transfer gear connected to a sixth pinion gear. A first stage speed reduction is achieved by meshing the first pinion gear with the first transfer gear and the third transfer gear, and by meshing the second pinion gear with the second transfer gear and the fourth transfer gear. A second stage gear assembly has a first final drive gear and a second final drive gear. A second stage speed reduction is achieved by meshing the third pinion gear and the fifth pinion gear with the first final drive gear and by meshing the fourth pinion gear and the sixth pinion gear with the second final drive gear.

In another aspect of the present disclosure, two final drive axes form a stacked assembly and cancel axial loads of the first final drive gear and the second final drive gear.

In another aspect of the present disclosure, four transfer shaft assemblies defining: 1) a first shaft supporting the third pinion gear and the first transfer gear; 2) a second shaft supporting the fourth pinion gear and the second transfer gear; 3) a third shaft supporting the fifth pinion gear and the third transfer gear; and 4) a fourth shaft supporting the sixth pinion gear and the fourth transfer gear together form two stacked assemblies radially constrained with a nested bearing arrangement.

In another aspect of the present disclosure, the first final drive gear and the second final drive gear form a stacked assembly on an axis which is axially constrained with a nested bearing arrangement.

In another aspect of the present disclosure, the first pinion gear shaft assembly and the second pinion gear shaft assembly are radially parallel with: a first transfer gear axis and the third pinion gear; a second transfer gear axis and the fourth pinion gear; a third transfer gear axis and the fifth pinion gear, and a fourth transfer gear axis and the sixth pinion gear.

In another aspect of the present disclosure, the first pinion gear shaft assembly and the second pinion gear shaft assembly include the first pinion gear shaft assembly being rotatably and slidably disposed within the second pinion gear shaft assembly, and the first pinion gear shaft assembly and the second pinion gear shaft assembly are positioned on a same side of the input differential.

In another aspect of the present disclosure, a housing surrounding the first pinion gear shaft assembly, the second pinion gear shaft assembly, the first stage transfer gear assembly and the second stage gear assembly; a shaft supporting one of the fourth pinion gear and the first final drive gear; and an extending portion of the shaft rotatably supported by a bearing wherein the bearing is not supported by or connected to the housing.

According to several aspects, a method for operating an electric vehicle drive unit comprises: generating a torque from an electric motor; splitting the torque in an input differential into a first torque created by a first side gear and a second torque created by a second side gear; delivering the first torque to a first pinion gear shaft assembly having a first pinion gear, and delivering the second torque to a second pinion gear shaft assembly having a second pinion gear; connecting a first stage transfer gear assembly having a first transfer gear to a third pinion gear, joining a second transfer gear to a fourth pinion gear, fixing a third transfer gear to a fifth pinion gear, and coupling a fourth transfer gear to a sixth pinion gear; performing a first stage speed reduction by: meshing the first pinion gear with the first transfer gear and the third transfer gear; and meshing the second pinion gear with the second transfer gear and the fourth transfer gear; providing a second stage gear assembly having a first final drive gear and a second final drive gear; and generating a second stage speed reduction by: meshing the third pinion gear and the fifth pinion gear with the first final drive gear; and meshing the fourth pinion gear and the sixth pinion gear with the second final drive gear.

In another aspect of the present disclosure, the method includes positioning the first pinion gear shaft assembly and the second pinion gear shaft assembly on a same side of the input differential.

In another aspect of the present disclosure, the method includes configuring the first pinion gear and the second pinion gear having opposed helix hands to cancel axial loads of the first pinion gear and the second pinion gear.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
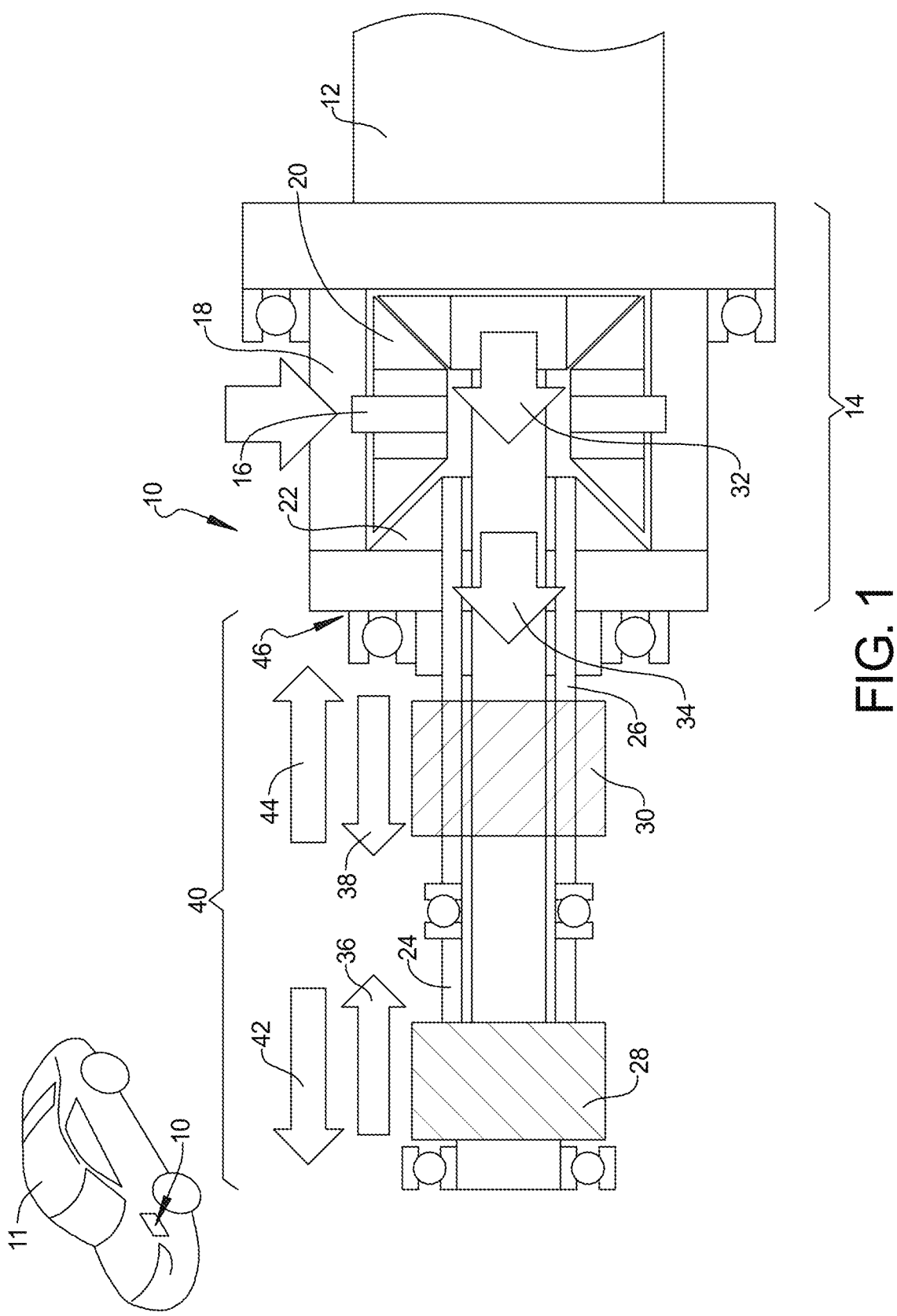
FIG. 1 is a side elevational cross sectional view of a portion of an electric drive unit according to an exemplary aspect.

Referring to FIG. 1, an electric drive unit 10 of a vehicle 11 such as a battery electric vehicle (BEV) receives torque from an electric motor 12 of a singular electric machine 14 and splits the torque into two paths via an input differential 16 having a differential housing 18. The input differential 16 provides for passive torque split into two paths by two side gears contained within the input differential 16. The two side gears create a first torque split by a first side gear 20 and a second torque split by a second side gear 22 which transfer the split torque to a first pinion gear shaft assembly 24 and a second pinion gear shaft assembly 26. The first and second pinion gear shaft assemblies 24, 26 are configured in a concentric and radially stacked arrangement having the first pinion gear shaft assembly 24 rotatably and slidably disposed within the second pinion gear shaft assembly 26, which allows for a compact and tightly packed configuration of the electric drive unit 10.

Figure 3:
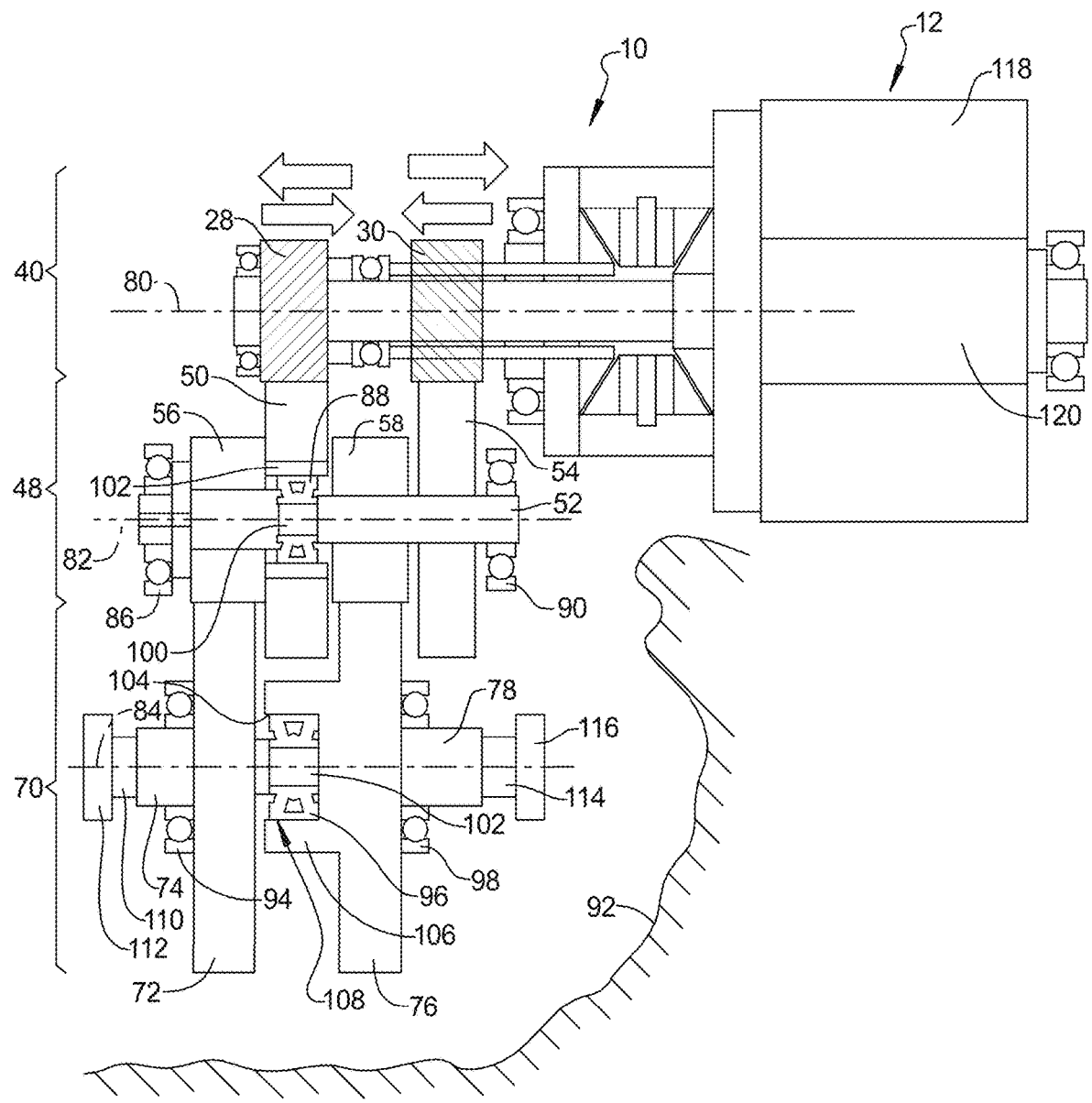
FIG. 3 is a side elevational cross sectional view taken at section 3 of FIG. 2.

Individual pinion gears defining a first pinion gear 28 connected to a free end of the first pinion gear shaft assembly 24 and a second pinion gear 30 connected externally to the second pinion gear shaft assembly 26 mesh with a pair of dual stage transfer gears shown and described in greater detail in reference to FIG. 3 allow torque to be split four times. Torque flows from the input differential 16 into the two concentric pinion gears defining the first pinion gear 28 and the second pinion gear 30 which have the same gear macro geometry with the exception of helix hands of the pinion gears. Torque from the input differential splits into a first path directed to the first pinion gear 28 and a second path directed to the second pinion gear 30. The pinion gear helix hands of the first pinion gear 28 and the second pinion gear 30 are opposite with respect to each other and therefore yield a net-zero axial load on an input axis shown and described in greater detail in reference to FIG. 3, and thereby provide both low gear loss and low bearing loss for the electric drive unit 10.

The first pinion gear shaft assembly 24 and the second pinion gear shaft assembly 26 are configured in a concentric arrangement which is radially stacked and the torsional stiffness of the first pinion gear shaft assembly 24 and the second pinion gear shaft assembly 26 are equal such that equal load sharing is enabled. A first output force 32 is delivered by the first pinion gear shaft assembly 24 and a second output force 34 is delivered by the second pinion gear shaft assembly 26. A same gear macro geometry with opposed helix hands of the first pinion gear 28 and the second pinion gear 30 allow for pinion gear axial load cancellation. As a result, a first pinion gear axial load 36 is oppositely directed with respect to a second pinion gear axial load 38 thus canceling the opposed pinion gear axial loads. The dual rotor pinion shafts defined by the first pinion gear shaft assembly 24 and the second pinion gear shaft assembly 26 therefore behave as a helical pinion gear assembly 40, without the limitations of machining two pinion gears onto a single shaft of a singular dual helical gear. During regenerative operation, a first pinion gear regenerative axial load 42 is oppositely directed with respect to a second pinion gear regenerative axial load 44. The electronic drive unit 10 of the present disclosure provides an input differential with side gear outputs on a first side 46 of the differential housing 18. In direct contrast, a conventional differential provides an output on opposed sides of a differential housing.

Referring to FIG. 2 and again to FIG. 1, according to several aspects, the helical pinion gear assembly 40 is engaged to a first stage transfer gear assembly 48 which may include a first transfer gear 50 defining a helical gear having a helix hand meshing with the first pinion gear 28. The first transfer gear 50 is supported on a first shaft 52. The first shaft 52 also rotatably supports a second transfer gear 54 defining a helical gear having a helix hand meshing with the second pinion gear 30. A third pinion gear 56 defining a helical gear and a fourth pinion gear 58 defining a helical gear are also supported on the first shaft 52.

According to several aspects, the first stage transfer gear assembly 48 may further include a third transfer gear 60 defining a helical gear having a helix hand meshing with the first pinion gear 28 and oppositely rotating with respect to the first transfer gear 50. The third transfer gear 60 is supported on a second shaft 62. A fourth transfer gear 64 defining a helical gear has a helix hand meshing with the second pinion gear 30 and oppositely rotating with respect to the second transfer gear 54. The fourth transfer gear 64 is also supported on the second shaft 62. A fifth pinion gear 66 defining a helical gear is supported on the second shaft 62 together with the third transfer gear 60. A sixth pinion gear 68 defining a helical gear is supported on the second shaft 62 together with the fourth transfer gear 64. Engaging the first pinion gear 28 and the second pinion gear 30 of the helical pinion gear assembly 40 with the transfer gears of the first stage transfer gear assembly 48 provides a first stage speed reduction. Together, the first shaft 52 and the second shaft 62 with their supported pinion and transfer gears define four (4) transfer shaft assemblies.

The first stage transfer gear assembly 48 engages a second stage gear assembly 70. A first final drive gear 72 of the second stage gear assembly 70 is mounted on a first final drive gear shaft 74 and helix hands of the first final drive gear 72 engage the helix hands of the third pinion gear 56 and the fifth pinion gear 66. A second final drive gear 76 of the second stage gear assembly 70 is mounted on a second final drive gear shaft 78 and helix hands of the second final drive gear 76 engage the helix hands of the fourth pinion gear 58 and the sixth pinion gear 68. Engaging the pinion gears of the first stage transfer gear assembly 48 with the first final drive gear 72 and the second final drive gear 76 of the second stage gear assembly 70 provides a second stage speed reduction.

Figure 2:
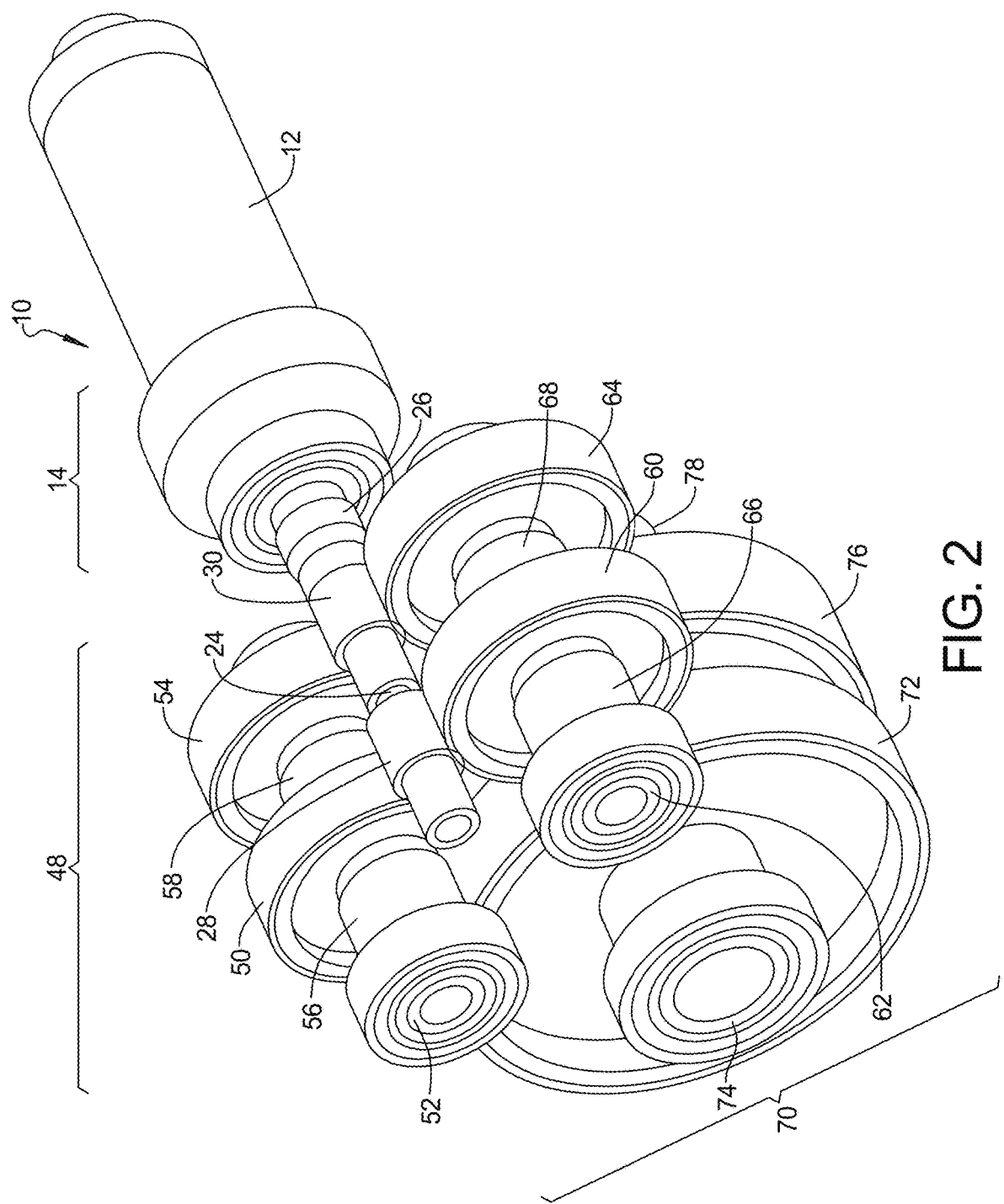
FIG. 2 is a front perspective view of a complete electric drive unit of the present disclosure.

Referring to FIG. 3 and again to FIGS. 1 and 2, components of the helical pinion gear assembly 40 are configured on a first axis 80, components of the first stage transfer gear assembly 48 are configured on a second axis 82, and components of the second stage gear assembly 70 are configured on a third axis 84. It is noted only half of the pinion gear and transfer gear components of the first stage transfer gear assembly 48 are shown for simplicity compared to FIG. 2 to identify bearing support components and concepts. According to several aspects three bearing assemblies are used to support components of the first stage transfer gear assembly 48. The three bearing assemblies include a first bearing assembly 86, a second bearing assembly 88 and a third bearing assembly 90. The three bearing assemblies of the first stage transfer gear assembly 48 are aligned on the second axis 82 but only the first bearing assembly 86 and the third bearing assembly 90 individually define two ground points of the first stage transfer gear assembly 48 to a housing 92 enclosing the electric drive unit 10. The second bearing assembly 88 is not supported by or connected to any structure of the housing 92.

According to several aspects three bearing assemblies are also used to support components of the second stage gear assembly 70. The three bearing assemblies of the second stage gear assembly 70 include a fourth bearing assembly 94, a fifth bearing assembly 96 and a sixth bearing assembly 98. The three bearing assemblies of the second stage gear assembly 70 are aligned on the third axis 84 but only the fourth bearing assembly 94 and the sixth bearing assembly 98 individually define two ground points of the second stage transfer gear assembly 70 to the housing 92 enclosing the electric drive unit 10. The fifth bearing assembly 96 is not supported by or connected to any structure of the housing 92 enclosing the electric drive unit 10.

According to several aspects an extending portion 100 coaxially extending from and integrally connected to the first shaft 52 is rotatably supported by the second bearing assembly 88. The second bearing assembly 88 is positioned within and supported by a bearing shaft 102 which is connected to the first transfer gear 50 such that the second bearing assembly 88 is not supported by or connected to any structure of the housing 92. According to several aspects two bearing assemblies are used to support components of the second stage gear assembly 48 directly to structure of the housing 92. The two bearing assemblies include the first bearing assembly 86 and the second bearing assembly 90. The two bearing assemblies supporting the second stage gear assembly 48 to structure of the housing 92 are aligned on the second axis 82 and individually define one of two ground points of the second stage gear assembly 48 to the housing 92.

Similar to the second bearing assembly 88, the fifth bearing assembly 96 is supported via a shaft extending portion 102 of the first final drive gear shaft 74. The shaft extending portion 102 is positioned within a cavity 104 created in an extending wall 106 of the second final drive gear 76. The fifth bearing assembly 96 is seated against an inner face 108 of the extending wall 106. As noted above, the fifth bearing assembly 96 is not supported by or connected to any structure of the housing 92 enclosing the electric drive unit 10. According to several aspects two bearing assemblies are used to support components of the third stage gear assembly 70 directly to structure of the housing 92. The two bearing assemblies include the fourth bearing assembly 94 and the sixth bearing assembly 98. The two bearing assemblies supporting the third stage gear assembly 70 to structure of the housing 92 are aligned on the third axis 84 and individually define one of two ground points of the third stage gear assembly 70 to the housing 92.

To produce a vehicle drive force, a first half shaft 110 is splined to the first final drive gear shaft 74, and a first wheel 112 is mounted to the first half shaft 110. Similarly, a second half shaft 114 is splined to the second final drive gear shaft 78, and a second wheel 116 is mounted to the second half shaft 114. With continuing reference to FIG. 1, according to several aspects electric power is generated by the electric motor 12 and delivered to the input differential 16 by a rotor 118 delivering electric power to the differential 14 via a rotor shaft 120.

It is noted axial and radial gear loads are canceled by the gear helix hands of the first stage dual helical gear assembly 40 of the electric drive unit 10 of the present disclosure. For example, opposed helix hands of the first pinion gear 28 and the second pinion gear 30 cancel the axial gear loads of the first pinion gear 28 and the second pinion gear 30. Alignment of the first pinion gear 28 with the first transfer gear 50 and the fifth transfer gear 60, and alignment of the second pinion gear 30 with the second transfer gear 54 and the fourth transfer gear 64 cancels radial loads of these gears. Center points of the transfer gears and center points of the motor pinion gears of each respective axis shown and described in greater detail in reference to FIG. 3 are colinear, or substantially colinear including packing effects, thereby also canceling radial gear load.

Individual transfer gear assemblies include a first stage speed reduction and a second stage speed reduction. The first stage speed reduction is achieved through meshing of motor pinion gears on the input axis and the transfer gears. The second speed reduction is achieved through meshing of final drive pinion gears, four total, with two (2) final drive gears.

An electronic drive unit of the present disclosure provides four transfer shaft assemblies formed by two large stacked assemblies of the pinion gear axes and a pair of transfer gears axes. This allows for axial and radial load cancelation per pair of transfer shaft assemblies. An exemplary pair of the transfer shaft assemblies defining one of the two large stacked assemblies includes the first shaft 52 supporting the third pinion gear 56 and the first transfer gear 50, and the third shaft 62 supporting the fifth pinion gear 66 and the third transfer gear 60.

An electronic drive unit of the present disclosure provides an architecture using two final drive axes, the second axis 82 and the third axis 84, forming one larger stacked assembly. This allows axial load canceling per pair of final drive gears defining for example the first final drive gear 72 and the second final drive gear 76.

An electronic drive unit of the present disclosure provides an architecture using four (4) transfer shaft assemblies forming two larger stacked assemblies which are radially inline with pinion gear axes and a pair of transfer gears axes that are constrained with a nested bearing arrangement. The four (4) transfer shaft assemblies define: 1) the first shaft 52 supporting the third pinion gear 56 and the first transfer gear 50; 2) the first shaft 52 supporting the fourth pinion gear 58 and the second transfer gear 54; 3) the second shaft 62 supporting the fifth pinion gear 66 and the third transfer gear 60; and the second shaft 62 supporting the sixth pinion gear 68 and the fourth transfer gear 64.

The electric drive unit 10 of the present disclosure defines an architecture for electric drive units for electric vehicles. The electric drive unit design receives an electric motor torque from a singular electric machine and splits the electric motor torque using two pinion gears into two paths via an input differential. The two pinion gears individually mesh with individual pairs of transfer gears, thereby providing a total of four transfer gears. Center points of the transfer gear and center points of the motor pinion gear individual axes are substantially colinear including packing effects, thereby canceling radial gear loads. The two pairs of transfer shaft assemblies are configured in a stacked arrangement having a common macro geometry but having opposing helix hands thereby resulting in axial load cancellation on the transfer axes. The final drive gear assemblies are also stacked and load canceling.

The electric drive unit 10 of the present disclosure offers several advantages. These include: provision for minimum stress/maximum load sharing for gears and a differential while also providing for gear load cancellation; minimizing bearing loads; and provision of an upstream differential through use of the present arrangement. The electric drive unit's basic elements include a stator, a rotor with combined differential, two motor pinions, four transfer axes, and two final drives.

The electric drive unit 10 of the present disclosure provides high drive unit efficiency; eliminates bending load on motor pinion shafts; minimizes loads on individual gears and reduces required gear sizes; provides for minimum bearing losses; minimizes mass of a differential; provides a stacked arrangement employed on transfer and final drive axes that minimizes loads and bearing size; and provides a concentric differential output shaft allowing for torque flow on the same side.

What is claimed is:

1. An electric vehicle drive unit, comprising:
an electric motor generating a torque;
an input differential splitting the torque into a first torque created by a first side gear and a second torque created by a second side gear;
a first pinion gear shaft assembly receiving the first torque and having a first pinion gear, and a second pinion gear shaft assembly receiving the second torque and having a second pinion gear;
a first stage transfer gear assembly having a first transfer gear, a second transfer gear, a third transfer gear, and a fourth transfer gear;
a first stage speed reduction achieved by meshing the first pinion gear with the first transfer gear and the third transfer gear, and by meshing the second pinion gear with the second transfer gear and the fourth transfer gear; and
a second stage gear assembly engaged with the first stage transfer gear assembly, the second stage gear assembly having a first final drive gear and a second final drive gear.

2. The electric vehicle drive unit of claim 1, wherein the first pinion gear shaft assembly and the second pinion gear shaft assembly are positioned on a same side of the input differential.

3. The electric vehicle drive unit of claim 2, wherein the first pinion gear shaft assembly and the second pinion gear shaft assembly are configured in a concentrically stacked arrangement and a radially stacked arrangement.

4. The electric vehicle drive unit of claim 3, wherein the concentrically stacked arrangement and the radially stacked arrangement of the first and second pinion gear shaft assemblies includes the first pinion gear shaft assembly being rotatably and slidably disposed within the second pinion gear shaft assembly.

5. The electric vehicle drive unit of claim 1, wherein the first pinion gear and the second pinion gear have opposed helix hands canceling axial loads of the first pinion gear and the second pinion gear.

6. The electric vehicle drive unit of claim 1, wherein the first transfer gear of the first stage transfer gear assembly is connected to a third pinion gear, the second transfer gear is connected to a fourth pinion gear, the third transfer gear is connected to a fifth pinion gear, and the fourth transfer gear is connected to a sixth pinion gear.

7. The electric vehicle drive unit of claim 6, further including a second speed reduction achieved by meshing the third pinion gear and the fifth pinion gear with the first final drive gear and by meshing the fourth pinion gear and the sixth pinion gear with the second final drive gear.

8. The electric vehicle drive unit of claim 6, wherein a center point of individual axes of: the first transfer gear and the third pinion gear; of the second transfer gear and the fourth pinion gear; of the third transfer gear and the fifth pinion gear; and of the fourth transfer gear and the sixth pinion gear are colinear, thereby canceling radial loads.

9. The electric vehicle drive unit of claim 6, including:
a housing surrounding the first pinion gear shaft assembly, the second pinion gear shaft assembly, the first stage transfer gear assembly and the second stage gear assembly;
a shaft supporting the fourth pinion gear together with the second transfer gear; and
an extending portion of the shaft is rotatably supported by a bearing wherein the bearing is not supported by and connected to the housing.

10. An electric vehicle drive unit, comprising:
- an electric motor generating a torque;
- an input differential splitting the torque into a first torque created by a first side gear and a second torque created by a second side gear;
- a first pinion gear shaft assembly receiving the first torque and having a first pinion gear, and a second pinion gear shaft assembly receiving the second torque and having a second pinion gear;
- a first stage transfer gear assembly having a first transfer gear connected to a third pinion gear, a second transfer gear connected to a fourth pinion gear, a third transfer gear connected to a fifth pinion gear, and a fourth transfer gear connected to a sixth pinion gear;
- a first stage speed reduction achieved by meshing the first pinion gear with the first transfer gear and the third transfer gear, and by meshing the second pinion gear with the second transfer gear and the fourth transfer gear;
- a second stage gear assembly having a first final drive gear and a second final drive gear; and
- a second stage speed reduction achieved by meshing the third pinion gear and the fifth pinion gear with the first final drive gear and by meshing the fourth pinion gear and the sixth pinion gear with the second final drive gear.

11. The electric vehicle drive unit of claim 10, including two final drive axes forming a stacked assembly canceling axial loads of the first final drive gear and the second final drive gear.

12. The electric vehicle drive unit of claim 10, wherein the first final drive gear and the second final drive gear form a stacked assembly on an axis which is axially constrained with a nested bearing arrangement.

13. The electric vehicle drive unit of claim 10, wherein the first pinion gear shaft assembly and the second pinion gear shaft assembly are radially parallel with: a first transfer gear axis and the third pinion gear; a second transfer gear axis and the fourth pinion gear; a third transfer gear axis and the fifth pinion gear; and a fourth transfer gear axis and the sixth pinion gear.

14. The electric vehicle drive unit of claim 10, wherein the first pinion gear shaft assembly and the second pinion gear shaft assembly include the first pinion gear shaft assembly being rotatably and slidably disposed within the second pinion gear shaft assembly, and the first pinion gear shaft assembly and the second pinion gear shaft assembly are positioned on a same side of the input differential.

15. The electric vehicle drive unit of claim 10, including:
- a housing surrounding the first pinion gear shaft assembly, the second pinion gear shaft assembly, the first stage transfer gear assembly and the second stage gear assembly;
- a shaft supporting one of the fourth pinion gear and the first final drive gear; and
- an extending portion of the shaft rotatably supported by a bearing wherein the bearing is not supported by and connected to the housing.

16. A method for operating an electric vehicle drive unit, comprising:
- generating a torque from an electric motor;
- splitting the torque in an input differential into a first torque created by a first side gear and a second torque created by a second side gear;
- delivering the first torque to a first pinion gear shaft assembly having a first pinion gear, and delivering the second torque to a second pinion gear shaft assembly having a second pinion gear;
- connecting a first stage transfer gear assembly having a first transfer gear to a third pinion gear, joining a second transfer gear to a fourth pinion gear, fixing a third transfer gear to a fifth pinion gear, and coupling a fourth transfer gear to a sixth pinion gear;
- performing a first stage speed reduction by: meshing the first pinion gear with the first transfer gear and the third transfer gear; and meshing the second pinion gear with the second transfer gear and the fourth transfer gear;
- providing a second stage gear assembly having a first final drive gear and a second final drive gear; and
- generating a second stage speed reduction by: meshing the third pinion gear and the fifth pinion gear with the first final drive gear; and meshing the fourth pinion gear and the sixth pinion gear with the second final drive gear.

17. The method of claim 16, further including positioning the first pinion gear shaft assembly and the second pinion gear shaft assembly on a same side of the input differential.

18. The method of claim 16, further including configuring the first pinion gear and the second pinion gear having opposed helix hands to cancel axial loads of the first pinion gear and the second pinion gear.

* * * * *